United States Patent [19]

Tsuruta et al.

[11] Patent Number: 5,224,204

[45] Date of Patent: Jun. 29, 1993

[54] INFERENCE METHOD AND SYSTEM

[75] Inventors: Setsuo Tsuruta, Machida; Kuniaki Matsumoto, Tokyo; Masahiro Matsumoto, Yokohama; Seiichi Sasaki, Hiratsuka; Akira Taniguchi, Yokohama, all of Japan

[73] Assignee: Hitachi, Ltd., Tokyo, Japan

[21] Appl. No.: 654,378

[22] Filed: Feb. 12, 1991

[30] Foreign Application Priority Data

Mar. 7, 1990 [JP] Japan .................... 2-56000

[51] Int. Cl.$^5$ ............................................ G06F 15/18
[52] U.S. Cl. ...................................... 395/51; 395/54; 395/925
[58] Field of Search ............ 395/76, 51, 54, 11, 395/53, 55

[56] References Cited

U.S. PATENT DOCUMENTS

| | | | |
|---|---|---|---|
| 4,648,044 | 3/1987 | Hardy et al. | 364/513 |
| 4,918,621 | 4/1990 | Nado et al. | 364/513 |
| 4,930,071 | 5/1990 | Tou et al. | 364/300 |

OTHER PUBLICATIONS

Clayton, B. D., ART TM Programming Primer, 1985 Inference Corp., pp. 3-89.
Johnson et al., Expert Systems Architectures, GP Pub. Inc., 1988, pp. 48-63.
Tanimoto S. L., The Elements of Artificial Intelligence, Computer Science Press., 1987, pp. 139-164.
Gevarter, W. B., "The Nature and Evaluation of Commercial Expert System Building Tools", Computer, May 1987, pp. 24-41.
Mittal et al., "Patrec: A Knowledge-Directed Database for a Diagnostic Expert System", Computer, Sep. 1984, pp. 51-58.
Wah et al., "MANIP—A Multicomputer Architecture for Solving Combinatorial Extremum-Search IEEE Trans. on Computers", May 1984, 377-390.
Inoue, K., "Problem Solving with Hypothetical Reasoning", Proc. Intl. Conf. on Fifth Generation Computer Systems, 1988, 1275-1281.
Wah et al., "A Survey on the Design of Multiprocessing Systems for Artificial Intelligence Applications", IEEE Trans. Syst., Man, and Cybernetics, Jul. 1989, 667-692.
Schmolze et al., "A Parallel Asynchronous Distributed Production System", Proc. Eighth National Conf. on Artificial Intelligence, Jul. 1990, 65-71.
Conry et al., "DARES: A Distributed Automated REasoning System" Proc. Eighth National Conf. on Artificial Intelligence, Jul. 1990, 78-85.
Ohta et al., "A Forward-Chaining Multiple-Context Reasoner and Its Application to Logic Design", Tools for Artificial Intelligence 90, Nov. 1990, 386-392.

Primary Examiner—Michael R. Fleming
Assistant Examiner—Robert W. Downs
Attorney, Agent, or Firm—Fay, Sharpe, Beall, Fagan, Minnich & McKee

[57] ABSTRACT

Inference management to estimate conflicting strategies for automatic presentation of a reliable strategy. Where a conflict is generated, the inferring are executed in parallel using replicated knowledge objects Hypothetical situation control includes a hypothetical situation relational table for describing the relationships between the strategies and hypothetical situations, an estimated contents decision program for fetching a hypothetical situation that is not usually generated when strategies are adopted from the hypothetical situation relational table to establish such hypothetical situation by interacting with the user, an estimated contents recording table for recording in a group the inferring results, estimated strategies, hypothetical situations and current situation data before the estimate with an estimate case number, and a hypothetical situation control program for controlling the inferring for the inferring results, for fetching hypothetical situations corresponding to a strategy to be estimated and for executing an estimate of its result.

57 Claims, 17 Drawing Sheets

| STRATEGY | HYPOTHETICAL SITUATION |
|---|---|
| STRATEGY A | SITUATION a<br>SITUATION b<br>SITUATION c |
| STRATEGY B | SITUATION a |
| ⋮ | ⋮ |

| NUMBER | ESTIMATED STRATEGY | HYPOTHETICAL SITUATION | CURRENT SITUATION DATA | ESTIMATED RESULT |
|---|---|---|---|---|
| 1 | STRATEGY A | SITUATION a | D1, D2, D3 | SUCCESS (LARGE) |
| 2 | STRATEGY B | SITUATION b | · | · |
| 3 | · | SITUATION c | · | · |
| 4 | · | SITUATION a | D4, D6 | FAILURE |
| · | · | · | · | · |
| · | · | · | · | · |
| · | · | · | · | · |

FIG. 9

| HYPOTHETICAL SITUATION TABLE |
|---|
| 1. SITUATION a |
| 2. SITUATION b |
| ⋮ |
| 10. SITUATION j |
| ⋮ |

FIG. 16

| | | |
|---|---|---|
| IF | ESTIMATING STRATEGY | STRATEGY A |
| THEN | HYPOTHETICAL SITUATION | SITUATION a |
| | | SITUATION b |
| | | SITUATION c |
| IF | ESTIMATING STRATEGY | STRATEGY B |
| THEN | HYPOTHETICAL SITUATION | SITUATION a |
| | ⋮ | |

FIG. 17

INFERENCE METHOD AND SYSTEM

BACKGROUND OF THE INVENTION

The present invention relates to inference management in a computer system executing expert knowledge information processes, and more particularly to an inference management suitable for the instruction support (command and control) for train rescheduling (restoration of the time in delay).

In the conventional inference management system, an inferring is executed syllogistically using a program module called "rule" comprising a section for setting conditions and a section for obtaining results, and a data group called "frame", in which generated events are hierarchy described to draw a conclusion. However, when there is any conflict generated for the know-how of experts, a system and a method are needed to solve such conflict in accordance with its situation. In other words, if any conflict is generated for a plan to achieve an object and to execute such a plan, an approximation inferring approach by certainty factors is adopted to give a fixed priority to each strategy or to reconcile such conflict interactively with the user.

In this respect, there is a system of this kind disclosed in U.S. Pat. No. 4,648,044 (Basic Expert System Tool, Technowledge, Mar. 3, 1987).

SUMMARY

It is an object of the present invention to determined and analyze problems of other systems and solve such problems, and more generally, improve upon such systems.

In the above-mentioned prior art, it is impossible to select strategies flexibly, and there may be some cases where an imbalance or overlook occurs in a judgement based on the user's past experiences. Also, the quantitative method depending on certainty factors is questionable when the object of the problem to be inferred is the action of a person or an organization, because in that case, a situation and an action indicating a low possibility in terms of figures, such as probability, etc., are often important.

The object of the present invention is to provide an inference management for improving these points to estimate conflicting strategies completely for an automatic presentation of a highly reliable strategy, so that the man-machine interaction can be enhanced to support the user's strategy judgement.

In order to achieve the objects mentioned above, an inference management according to the present invention is provided with a kernel knowledge section and a plurality of different expert knowledge models for inferring. A kernel knowledge section has a procedure for activating one of these experts knowledge models to schedule and execute the inferring, a procedure for replicating itself and the same expert knowledge model, and a procedure for removing replications by an agent management object having a knowledge of replicate/remove timing and resource scheduling. In the case where a conflict is generated, the inferring processes are executed in parallel for different strategies using the replicated kernel knowledge sections and expert knowledge models.

Also, in inference management according to the present invention, a hypothetical situation control section is provided, including a current situation data retaining section for retaining the data obtained when the conflict is generated for strategies, a hypothetical situation relational table for describing the relationships between the strategies and hypothetical situations, an estimated contents decision program for fetching a hypothetical situation that is not usually generated when strategies are adopted from the hypothetical situation relational table to establish such hypothetical situation by interacting with the user, an estimated contents recording table for recording in a group the inferring results, estimated strategies, hypothetical situations and current situational data before the estimate with an estimate case number, and a hypothetical situation control program for controlling the inferring for the inferring results, for fetching hypothetical situations corresponding to a strategy to be estimated and for executing an estimate of its result.

In the present invention, the required items are established in a knowledge object having an agent management object to store information, such as an expert knowledge model currently in activation, conflicting rules, strategies, etc., so that the conflicting hypothetical situations of the strategies are defined. Also, there are procedures for replicating itself and it's own expert knowledge model, removing previous replications, establishing replicate/remove timing and executing the resource scheduling that are managed when a conflict is generate between several cases, and the several cases can be inferred in parallel to estimate the conflicting strategies completely. Thus a highly reliable strategy can be proposed automatically.

Also, in the present invention, the current situation relating section retains the data when the conflict is generated for strategies, making it possible to execute a plurality of strategy estimates with the same situational data that caused the conflict. Furthermore, since the hypothetical situation relational table stores an important hypothetical situation fetched as a know-how of the most reliable expert knowledge model, which should be taken into account for each strategy, the user can notice any point that may be overlooked in making judgement. Also, the estimated contents decision program fetches from the hypothetical situation relational table the hypothetical situation at the time of the strategy estimate executed and operates itself as a man-machine interface program to be defined by interacting with the user. Furthermore, as the estimated contents recording table stores in a group the estimated strategies, hypothetical situations, estimated results, and the data when the conflict is generated for strategies with an estimate case number, it is possible to fetch this information to support judgement in the case where the same conflict is again generated for the strategies. In addition, the hypothetical situation control program controls the inferring processes for the strategy estimated and recording processes for the inferring results, and operates as a control program to make it possible to execute several cases for a strategy estimate.

Also, the hypothetical situation relational table can be a part of a hypothetical situation relational knowledge section, thereby describing by rule the hypothetical situation table which is a data table of the hypothetical situations and the interrelation between the strategies to be estimated and the hypothetical situations, and by activating this hypothetical situation relational knowledge section when a strategy is inputted as an object of estimate, a hypothetical situation corresponding to the object strategy for the estimate can be fetched.

BRIEF DESCRIPTION OF THE DRAWINGS

Further objects, features and advantages of the present invention will be understood from the following embodiments shown in the drawing wherein:

FIG. 9 illustrates the structure of one of the estimated contents recording table shown in FIG. 7;

FIG. 16 illustrates the structure of the hypothetical situation table showing FIG. 15;

FIG. 17 illustrates the structure of the hypothetical situation relational knowledge section shown in FIG. 15;

With reference to the accompanying drawings, the present invention will be described.

Figure 1:
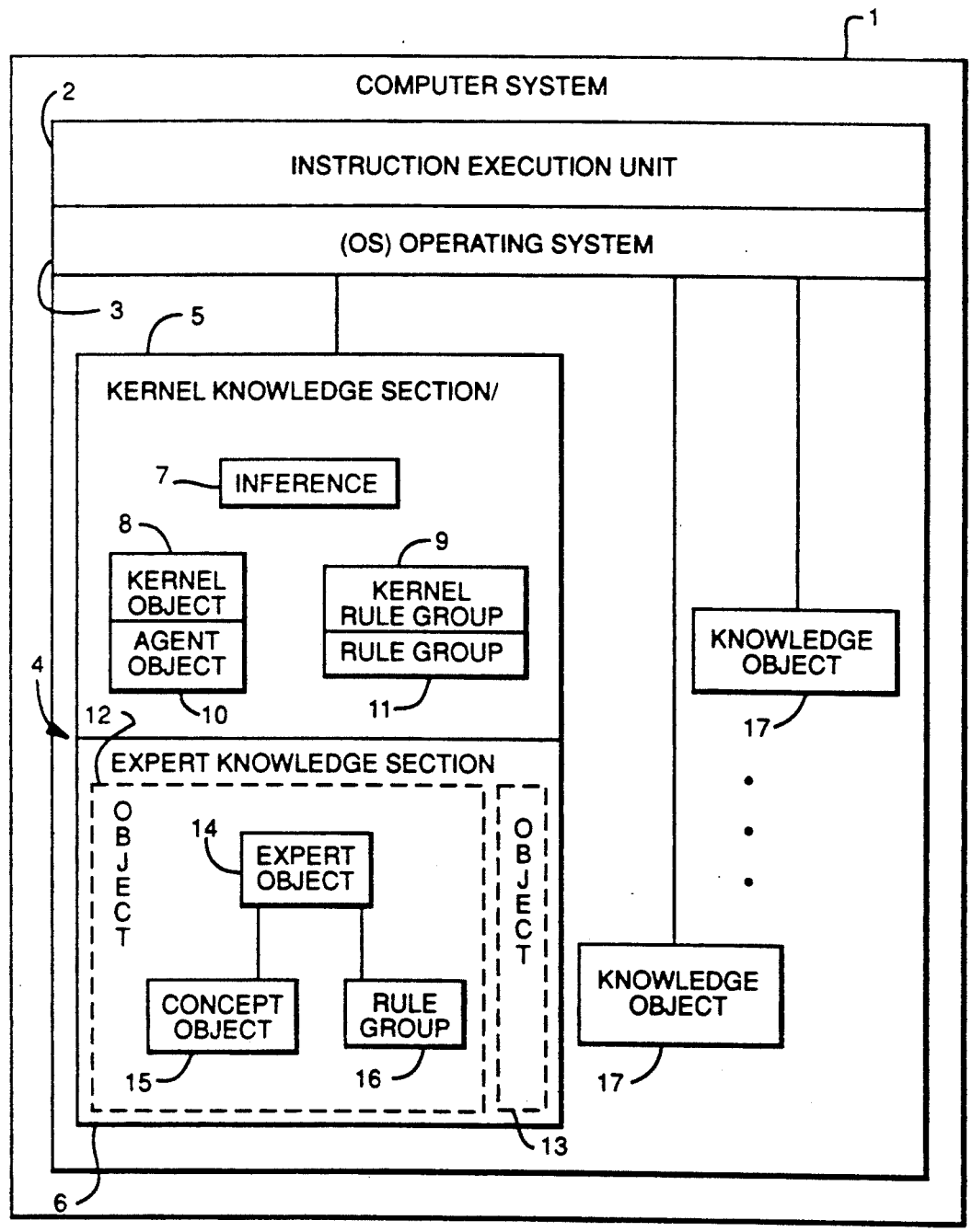
FIG. 1 illustrates the computer system according to the present invention.

DETAILED DESCRIPTION OF THE DRAWINGS:

FIG. 1 illustrates the function elements for use in a computer system 1 according to the present invention, including:

an instruction executing unit 2 using the machine language for the computer;

an operating system (OS) 3 supporting the operation of the computer system;

a knowledge object 4 for independently solving problems, which includes an expert knowledge section 6 and a kernel knowledge section 5; and the kernel knowledge section 5 having a kernel object 8, an agent management object 10, a kernel rule group 9, an agent management rule group 11, an inferring section 7 for inferring by executing these objects and rules with the expert knowledge section 6.

The expert knowledge section 6 has a plurality of expert knowledge models 12 and 13, each embedded with different individual expert know-how, respectively. Agent management object 10 executes parallel inferring by replicating knowledge object 4 as knowledge objects (replicated) 17. Each of the expert knowledge models 12 and 13 has a concept object 15 which is a local expert knowledge, an expert object 14 managing the concept object 15 and a judgement rule group 16. The knowledge objects (replicated) 17 are replicated knowledge objects 4. The knowledge object 4 is in ROM, and the knowledge objects (replicated) 17 are in RAM and may be removed by the kernel knowledge section 5 of the knowledge object 4. These elements are configured in software, RAM, ROM and dedicated hardware.

Figure 2:
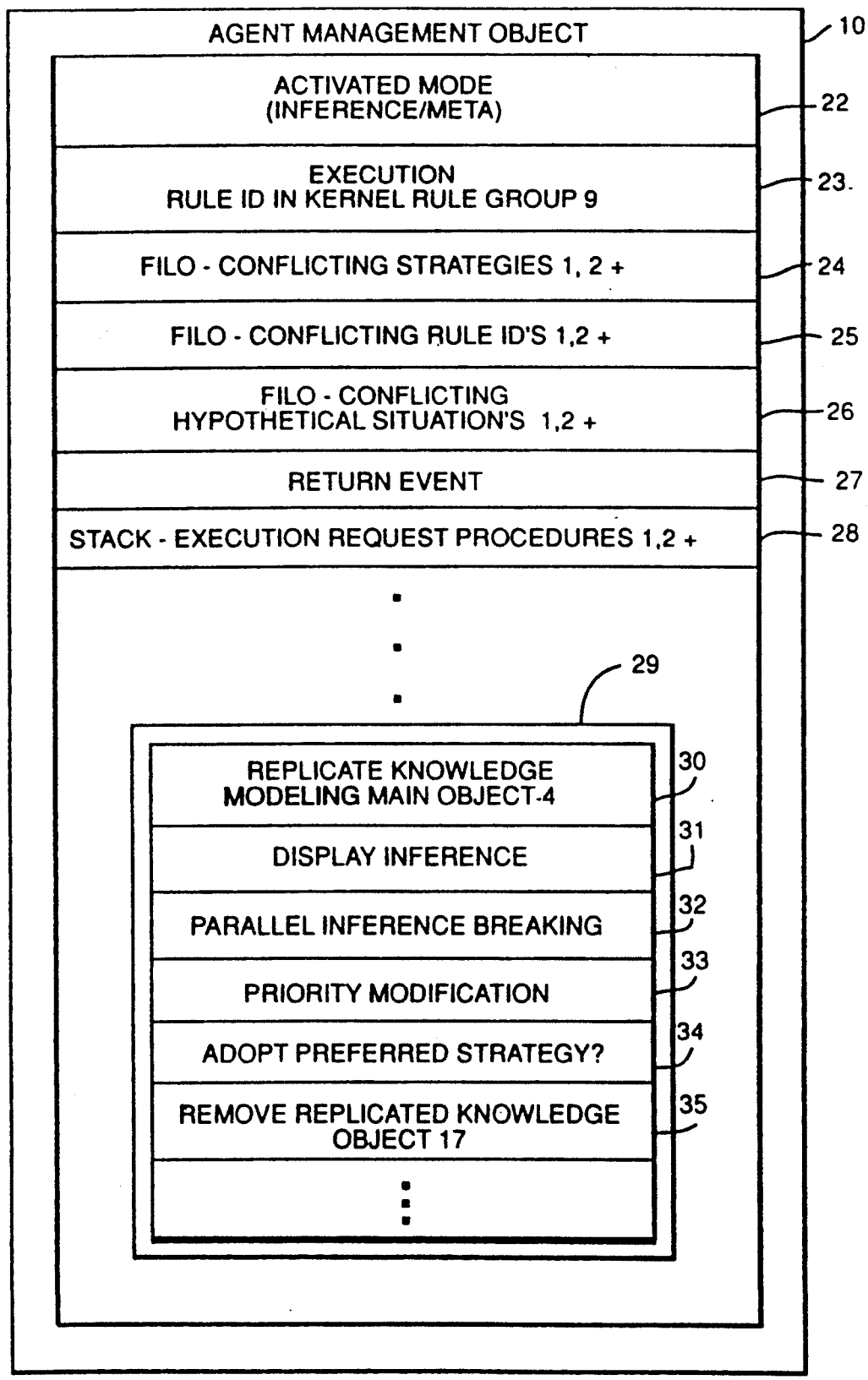
FIG. 2 illustrates the contents of the agent management object shown in FIG. 1.

FIG. 2 illustrates the contents of the agent management object 10 shown in FIG. 1.

The agent management object 10 comprises slots 22-28 described below and procedures 29.

Slot 22 stores the activated states (inference mode or meta mode) of the agent management object 10. Slot 23 stores the rule ID in the kernel rule group 9 which has brought forward conflicting strategies in executing inferring. Slot 24 is a stack (e.g. a FILO, first-in last-out memory) for retaining the conflicted strategies. Slot 25 stores rule ID's activated when each strategy of slot 24 is adopted, respectively. Slot 26 is a stack retaining hypothetical situations used when each strategy of slot 24 is adopted, respectively. Slot 27, upon removal of a knowledge object (replicated) 17, stores a return event for resuming the inferring by the knowledge object 4. Slot 28 is a stack for retaining procedures for requested execution.

Procedure 29, in slot 28 will be described as a group of procedures. Procedure 30 is for replicating the knowledge object 4 in a combinational number equal to the number of conflicting strategies of stack 24 times the number of hypothetical situations of stack 26. Procedure 31 is for displaying the hypothetical situations of each knowledge object 4. Procedure 32 is for breaking the inferring when the inferring of each kernel knowledge section 5 exceeds a given fixed time limit. Procedure 33 is for establishing/modifying the priority given to the conflicting strategies automatically in accordance with the rules or by interacting with the user, to estimate the inferring with other processes of each knowledge object (replicated) 17. Procedure 34 is for inquiring of the user about adoption or confirmation of the preferred strategy. Procedure 35 is for removing knowledge objects (replicated) 17.

Figure 3:
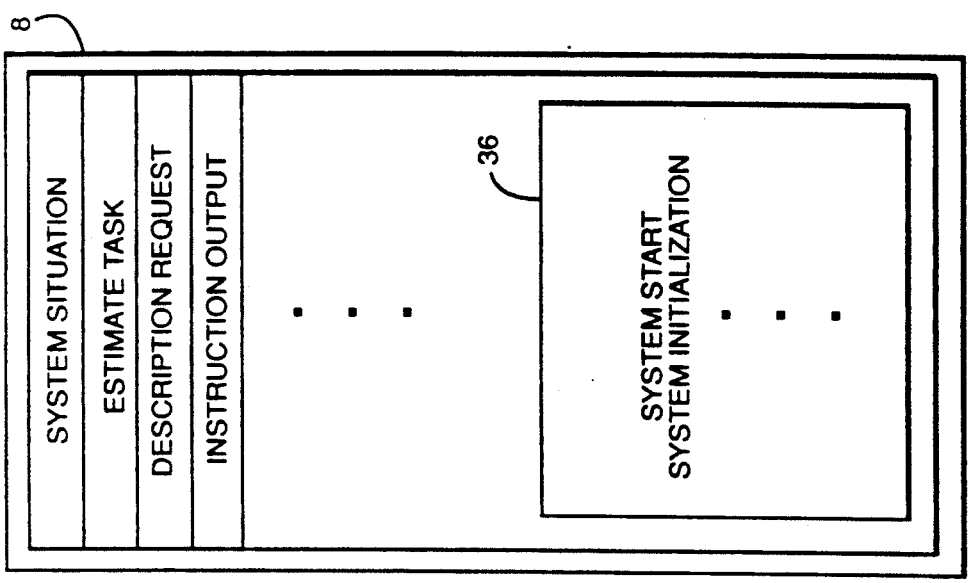
FIG. 3 illustrates the contents of the kernel object 10 shown in FIG. 1.

FIG. 3 illustrates the contents of the kernel object 8 shown in FIG. 1.

The kernel object 8 is for controlling and managing the inferring of the knowledge object 4, which also includes procedures 36, such as a system start procedure, system initialization procedure, etc..

Figure 4:
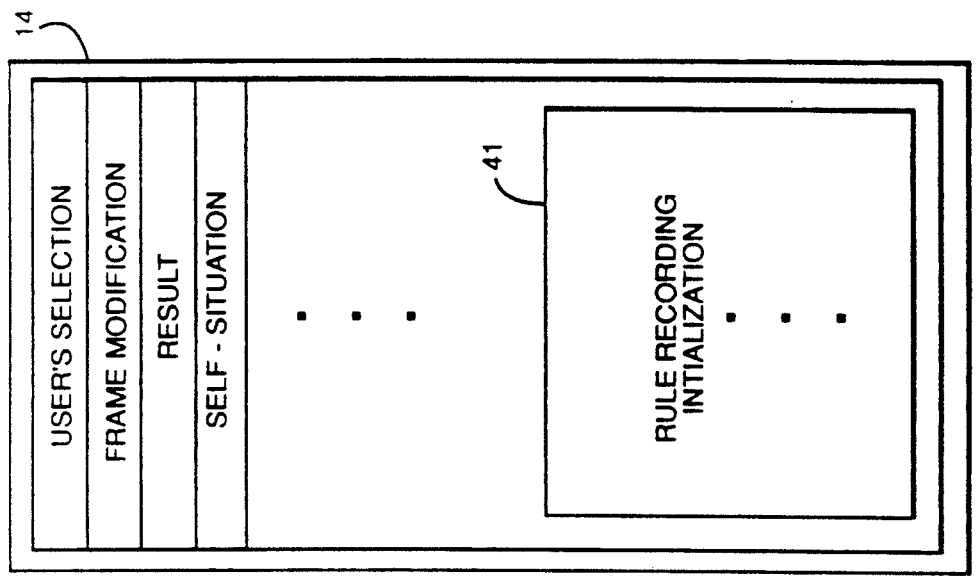
FIG. 4 illustrates the contents of the expert knowledge model shown in FIG. 1.

FIG. 4 illustrates the contents of the expert knowledge model 14 shown in FIG. 1. The expert knowledge model 14 is for controlling and managing a concept object 15 comprising a locally specialized expert knowledge, which includes procedures 41, such as recording procedure, initialization procedure, etc..

Figure 5A:
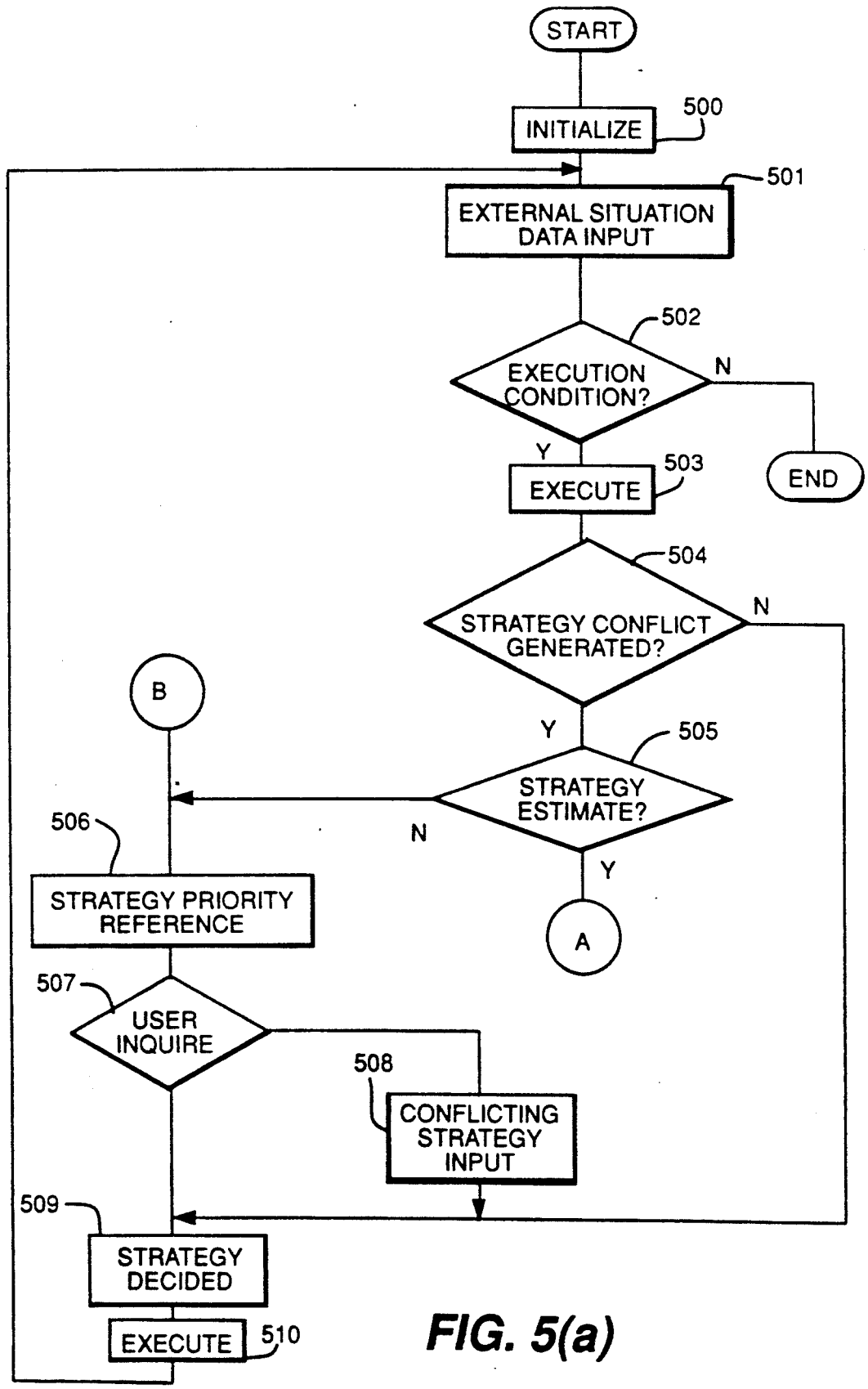
FIGS. 5(a) and (b) are flowcharts showing the processes performed by the computer system.
Figure 5B:
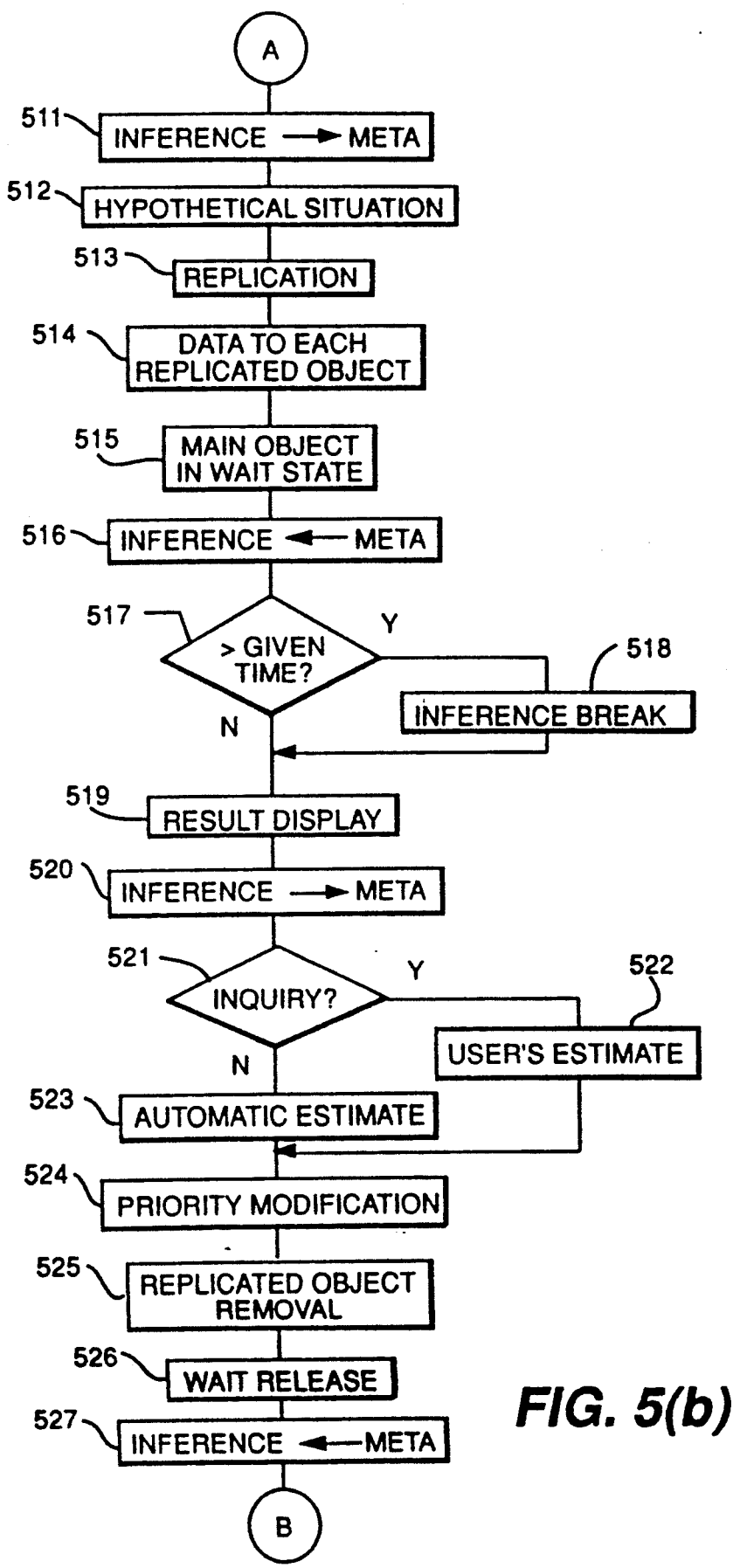

FIGS. 5(a) and (b) are flowcharts showing the process of the computer system according to the present invention. In this respect, the flowchart of FIG. 5(a) represents mainly the processes of the kernel rule group 9, while the flowchart of FIG. 5(b) represents the processes of the agent management rule group 11.

When a usual inferring cycle is made for an expert knowledge process of the kernel rule group 9, the execution uses the kernel object 8 and expert knowledge model 14. The system is first initialized at step 500, and then the external situational data are inputted automatically from the environment or storage, or by the user at step 501.

Subsequently, in step 502 the presence of an executable rule is examined, and if there is no such rule, the execution is terminated by proceeding to END of the process.

If there is any rule which is still executable, then it is executed in step 503, which may include generation of one or more strategies by the inference management system.

Next, in step 504 an examination is made to detect if any conflict is generated for the strategies in the course of the inferring or execution, and if there is no conflict generated, then the inferring is continued as it is by proceeding to step 509. If any conflict is detected, it is decided by step 505 through interaction with the user to determine if the system should estimate each strategy.

Then, if there is no strategy estimate requested by the user in step 505, the strategy priority is referenced in step 506 in order to reconcile the conflict of the strategies and inquire of the user about the adoption of the preferred strategy (507) to decide on the preferred strategy (509). This strategy thus decided is stored in the strategy priority as a preferred strategy. In accordance with such strategy, the rule is executed (510).

At the step 507, if any modification is requested by the user, a strategy other than the preferred strategy is selected from the displayed conflicting strategies through the intervention of the user, and such strategy is inputted in step 508. The strategy thus selectively inputted is automatically preferred when the next decision is made as to a preferred strategy.

At the step 505 of FIG. 5(a), if any strategy estimate is requested, the processing proceeds to step 511 of FIG. 5(b) to activate the agent management object 10 and change from inferring mode to meta mode.

The hypothetical situations predicted to occur after the adoption of a strategy are enumerated in step 512. Next, the knowledge object 4 is replicated by the replicating procedure 30 of the agent management object 10 in step 513 to produce new knowledge objects (replicated) 17. Then the situational data of the conflicting estimated strategies is placed in the knowledge objects (replicated) 17 by step 514, and the knowledge object 4 is placed in a wait state by step 515.

The activated state of the agent management object 10 is shifted from the meta mode to the inferring mode in step 516, and the inferring of each knowledge object (replicated) 17 is started, each with its own unique combination of a conflicting strategy and a hypothetical situation, with the common situational data existing at the time of conflict.

If this parallel inferring exceeds a given fixed time limit 517 according to decision step 517, the inferring is suspended by the parallel inferring breaking procedure 32 in step 518. Then the common situational data, unique strategy plus hypothetical situation with the results of inferring of the knowledge objects (replicated) 17 is displayed in the multi-window environment by the inferring process displaying procedure 31 in step 519. Also, if the inferring is completed in the given fixed time limit according to step 517, the inferring results, etc., are displayed in the multi-window environment in the same way by step 519.

Next, the inferring mode is shifted to the meta mode in step 520, and the inferring of each replicated knowledge object 17 is terminated.

Further, by the strategy priority modification procedure 33, the inferring result of each knowledge object (replicated) 17 is estimated automatically or interactively with the user, steps 521–523, and the priority of the estimated strategies is modified in step 525. An inquiry to the user is determined in step 521. If there is user intervention, step 522 inputs the estimate. If there is no user intervention, step 523 provides an automatic estimate.

The knowledge objects (replicated) 17 are removed and processing proceeds to the event stored in the slot 27 by step 525. The wait state of the object knowledge 4 is released in step 526. The meta mode is shifted to the inferring mode in step 527 to resume the inferring with step 506 of FIG. 5(a).

In this way, it is possible to allow each of the knowledge objects (replicated) 17 acting as agents to separately execute different inferring in parallel by managing through knowledge objects (replicated) 17 having at least the needed expert knowledge etc. of the object knowledge 4.

Figure 6:
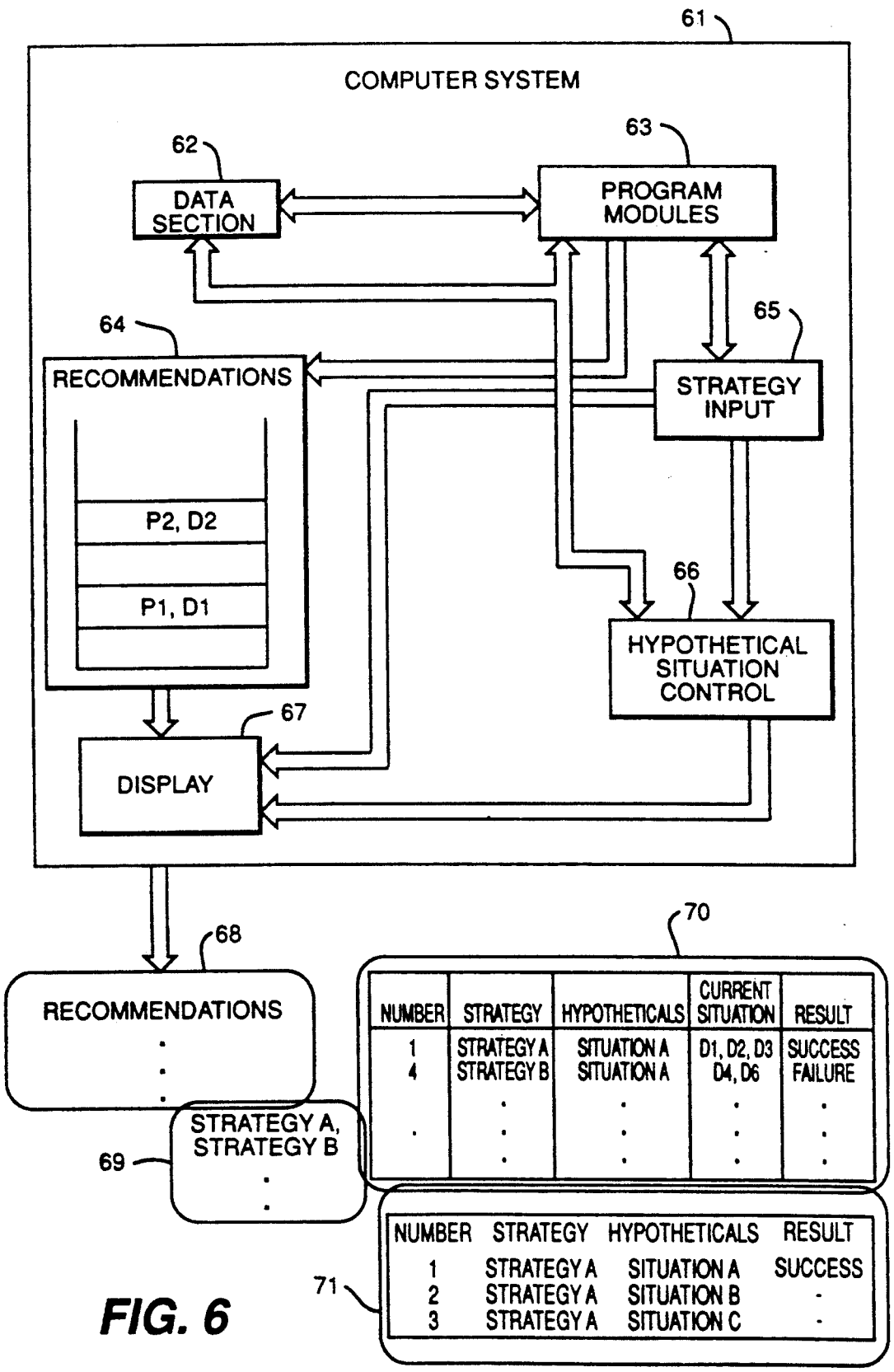
FIG. 6 is a view illustrating the computer system and inference management system.

In FIG. 6, a computer system 61 includes a data section 62, a program module group 63, a process history retaining section 64 having a plurality of recommendations, a strategy inputting section 65, a hypothetical situation control section 66, and a display section 67. Associated with the computer system are a recommendation display screen 69, a strategy selection screen 69, an estimated contents recording table display screen 70 and a decided estimate contents display screen 71. These are configured in software, RAM, ROM and dedicated hardware. Screens 68–71 may be separate devices or windows of a multi-window display screen.

The recommendations are produced in the data section 62 and the program modules used, and the referenced data are retained in the process history retaining section 64. The recommendations are displayed on the recommendation display screen 68 by the display section 67.

During this series of the inferring, if any conflict is generated for the strategies, the computer system 61 first displays the strategy selection screen 69 by the strategy inputting section 65 to request the user to decide on a strategy to be selected. Then, the hypothetical situation control section 66 supports planning an optimum strategy by displaying the estimated contents recording table display screen 70 in order to prevent any overlook in making judgement based on the user's private experimental expert knowledge and past experiences.

In addition, when the estimate is made, each kind of the estimate cases is inferred by simulation, by displaying the portions related to a strategy to be estimated among those items stated in the estimated contents recording table, such as the dedicated estimate contents screen 71, to show the inferring and inferring results, so that an effective support for the user is provided for deciding on the strategy.

Figures 7, 8:
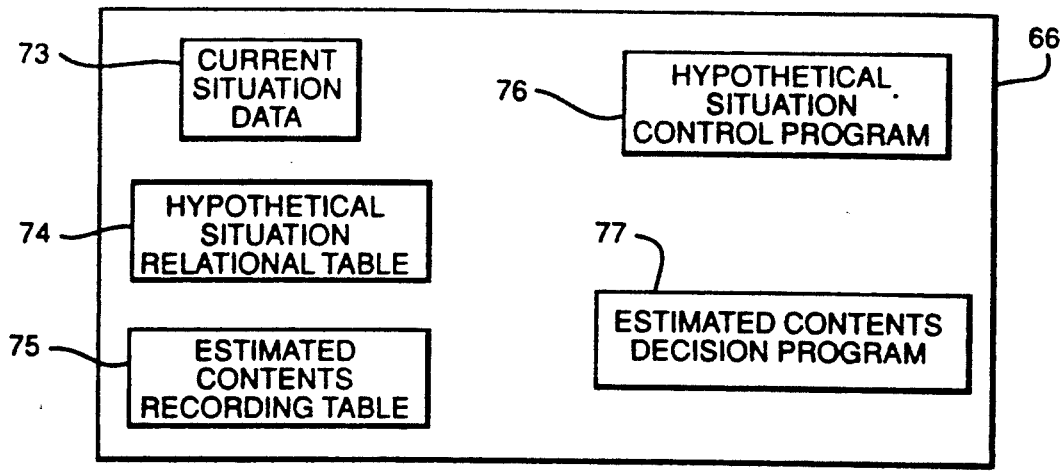
FIG. 7 illustrates the structure of the hypothetical situation control section shown in FIG. 6.
FIG. 8 illustrates the hypothetical situation relational table shown in FIG. 7.

FIG. 7 illustrates the structure of the hypothetical situation control section 66 shown in FIG. 6.

In FIG. 7, there are: a current situation data retaining section 73 for retaining the situational data when a conflict is generated for strategies; a hypothetical situation relational table 74 for recording each of the conflicting strategies and the corresponding hypothetical situation; an estimated contents recording table 75 for recording estimate strategies, hypothetical situation control program and current situation data with an estimate case number; a hypothetical situation control program 76 for controlling the hypothetical situation processes; and an estimated content decision program 77 for executing the estimated contents decision processes.

FIG. 8 illustrates the structure of the hypothetical situation table 74 shown in FIG. 7.

The hypothetical situation relational table 74 according to the present invention stores the hypothetical situation generated or induced by the expert as know-how for each of the corresponding strategies, i.e., a hypothetical situation which is not usually generated. The table specifically includes a plurality of strategies, and for each strategy one or more hypothetical situations.

FIG. 9 illustrates the structure of the estimated contents recording table 75 shown in FIG. 7.

The estimated contents recording table 75 stores the estimated strategies, hypothetical situations, current situational data, and estimated results with an estimate case number. In this respect, if an estimate result is a success, each of the successful estimates is provided with the priority indication (large), (medium) or (small). Also, if any estimate of a strategy which is not registered in the estimated contents recording table 75 is requested, the estimated strategy and the hypothetical situation thereof is newly registered with an estimate case number given with reference to the hypothetical situation relational table 74.

Figure 10:
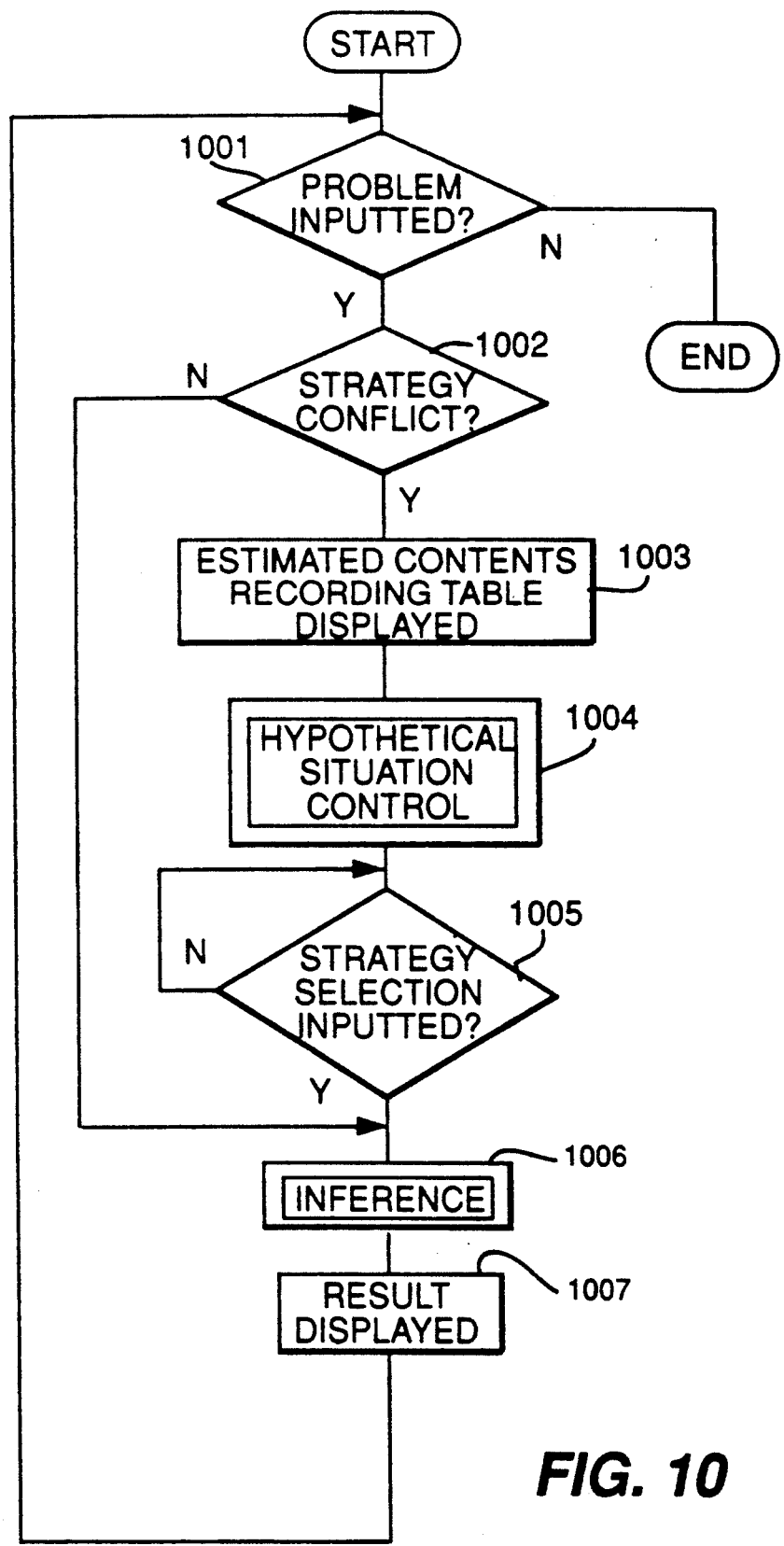
FIG. 10 is a flowchart showing processes performed by the computer system according to FIG. 6.

FIG. 10 is a flowchart showing processes of the computer system. The processes given below are repeated until a termination command is inputted.

First, a problem or a termination command is inputted and a judgement made if the input is a problem as a hypothetical situation, all in step 1001. If any conflict is generated for the strategies (determined by the system or user input) required to solve such problem as determined by step 1002, the strategy judgement is supported by displaying the renewed estimated contents recording table 75 according to step 1003. If there is no strategy conflict found in step 1003, processing proceeds to step 1006.

In the case of making a strategy estimate, a hypothetical situation control process is executed in step 1004, and there is selective input of a strategy or hypothetical situation in accordance with the estimate result by step 1005. Step 1005 waits for the user input. Then the inferring problem processing is executed in step 1006 and then the inferring result is displayed in step 1007.

Figure 11:
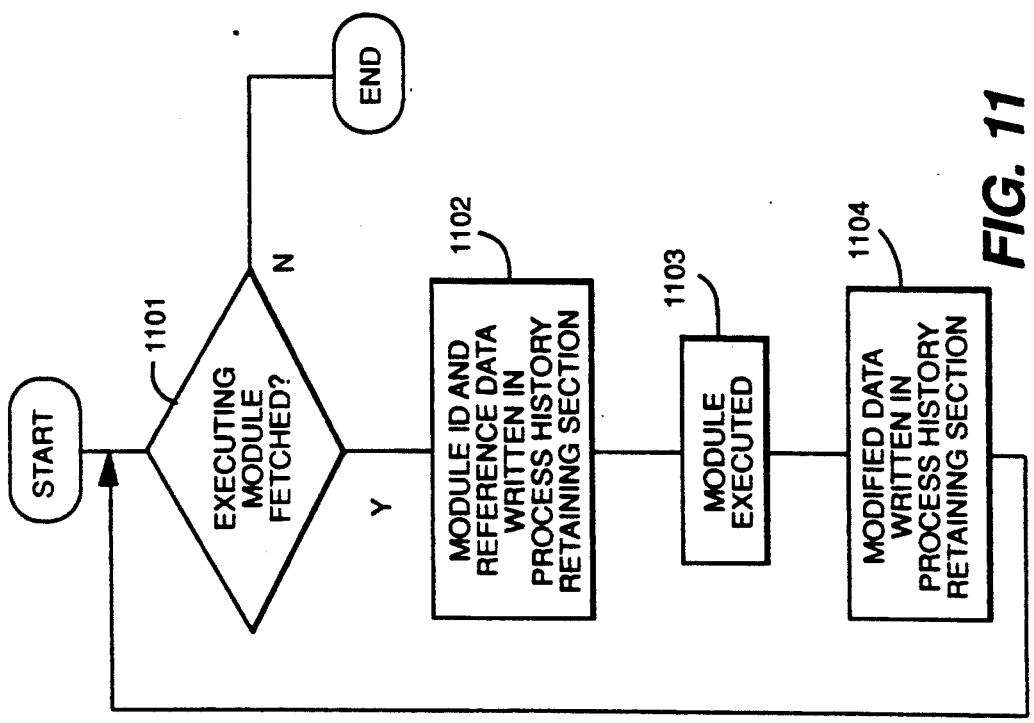
FIG. 11 is a flowchart showing the inferring processes according to the flowchart of FIG. 10.

Inferring to be executed by the program module which gains access to data will be described. FIG. 11 is a flowchart showing the inferring.

If any executionable module is present as determined by step 1101, the module ID and the value of the reference data are written in the process history retaining section 64, and its pointer is advanced in step 1102. If step 1101 finds no executionable module, the process is ended.

After the execution of the module in step 1103, the modified data are written in the process history retaining section 64, and its pointer is advanced in step 1104.

Figure 12:
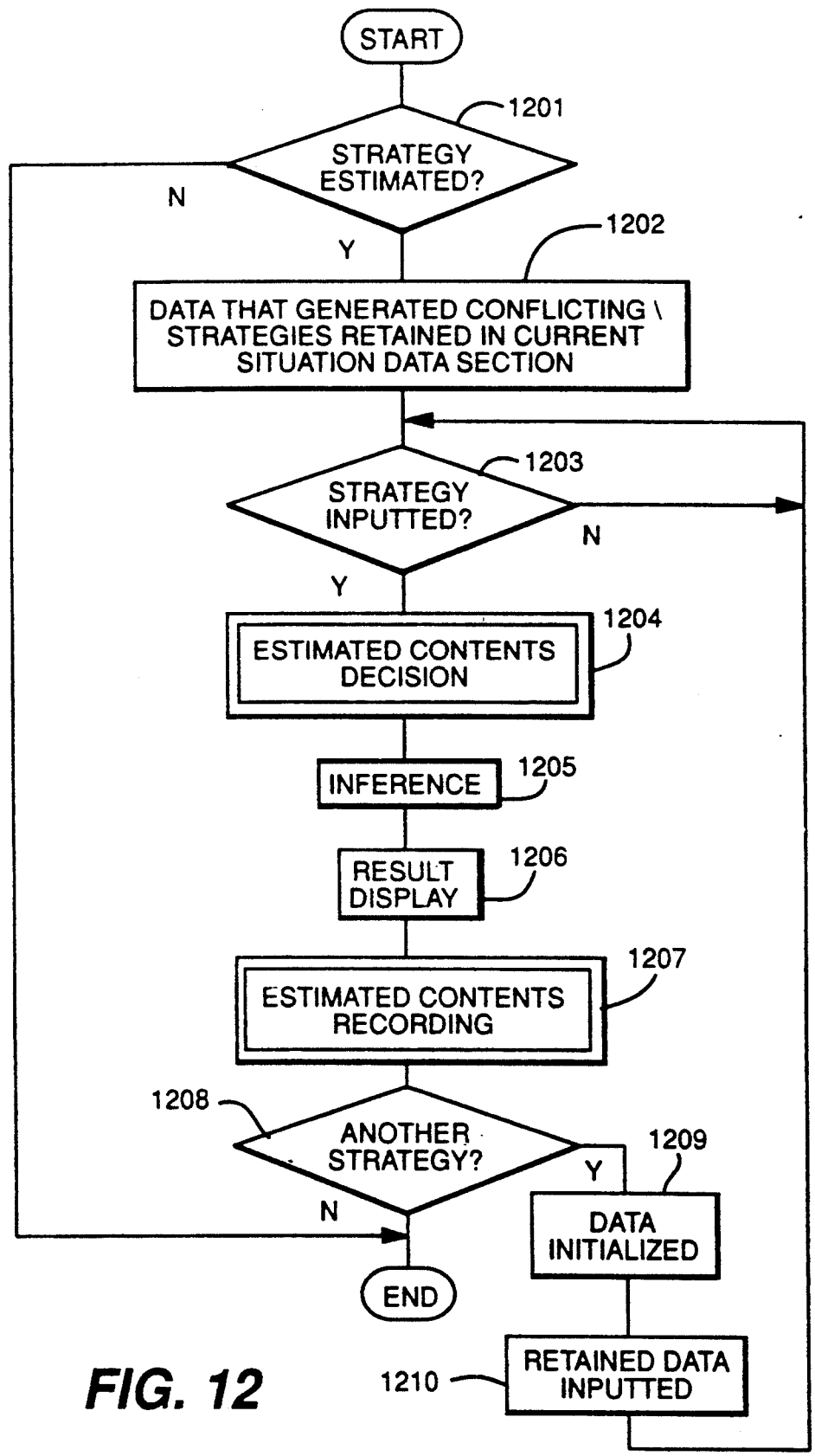
FIG. 12 is a flowchart showing the hypothetical situation control procedure.

FIG. 12 is a flow chart showing the processing of the hypothetical situation control process program 76. If a strategy estimate is executed as determined in step 1201, the situational data that generated the conflict is retained in the current situational data retaining section 73 by step 1202 and if there is no strategy estimated, the process ends. Next, step 1203 requests the user to input the estimated strategy selectively. When the strategy is selectively inputted, an estimated contents decision process is executed in step 1204, and a hypothetical situation expected at the time the estimated strategy is applied is inferred by simulation in step 1205 to display the inferring result in step 1206.

The estimated content recording process is executed to record the current situational data and inferring result in the estimated contents recording table 75 according to step 1207.

After this, if another strategy estimate is to be executed as determined in step 1209, the current situational data retained are reset in step 1210. From step 1210, control moves to step 1203. If decision 1208 is no, the processing of FIG. 12 ends.

Figure 13:
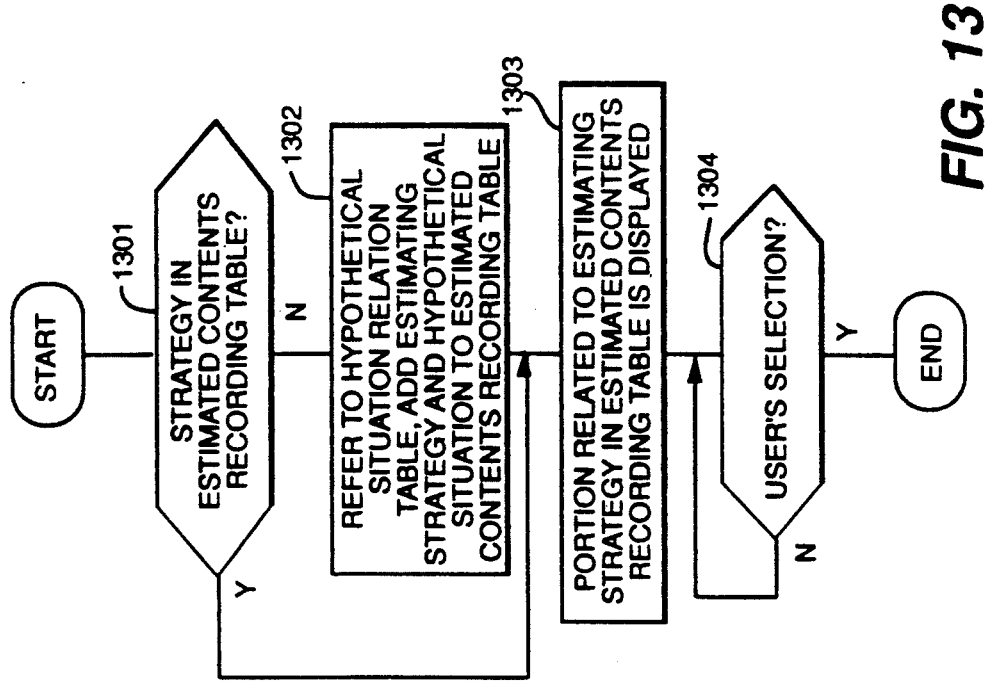
FIG. 13 is a flow chart showing the simulated contents decision processes.

FIG. 13 is a flowchart showing the estimated contents decision processes. If a strategy for which the estimate is requested does not reside in the estimated contents recording table 75 as determined by decisional step 1301, the hypothetical situation relational table 74 is referenced, and the strategy to be estimated and the corresponding hypothetical situation are added to the estimated contents recording table 75 by step 1302. Next, from those items stated in the estimated contents recording table 75, the portion related to the strategy to be estimated is displayed in the estimated contents screen 71 by step 1303. A yes answer in step 1301 also leads to the execution of step 1301. Then, the user is requested to input the case to be estimated by step 1304 for setting up input.

Figure 14:
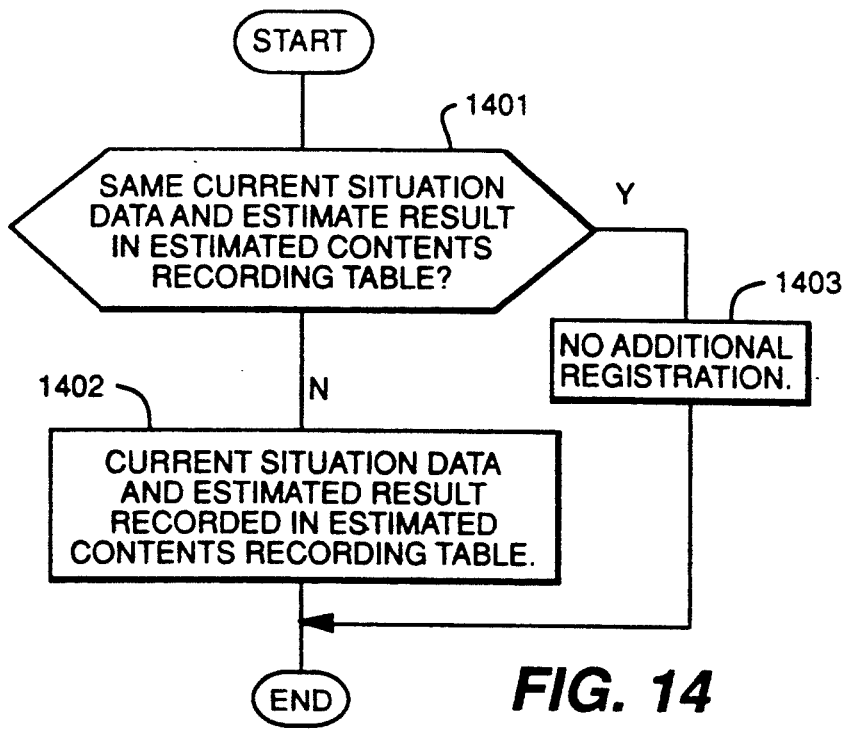
FIG. 14 is a flowchart showing the estimated contents recording processes.

FIG. 14 is a flowchart showing the estimated contents recording processes.

If the same current situational data and estimated result are already present for an estimate case in the estimated contents recording table 75 as determined by step 1401, such estimate case is not added to the estimated contents recording table 75 by null step 1403.

If the same current situation data and estimate result are absent, a new case number is given to the estimated case, and the current situational data and estimated result thereof are recorded in the estimated contents recording table by step 1402.

Figure 15:
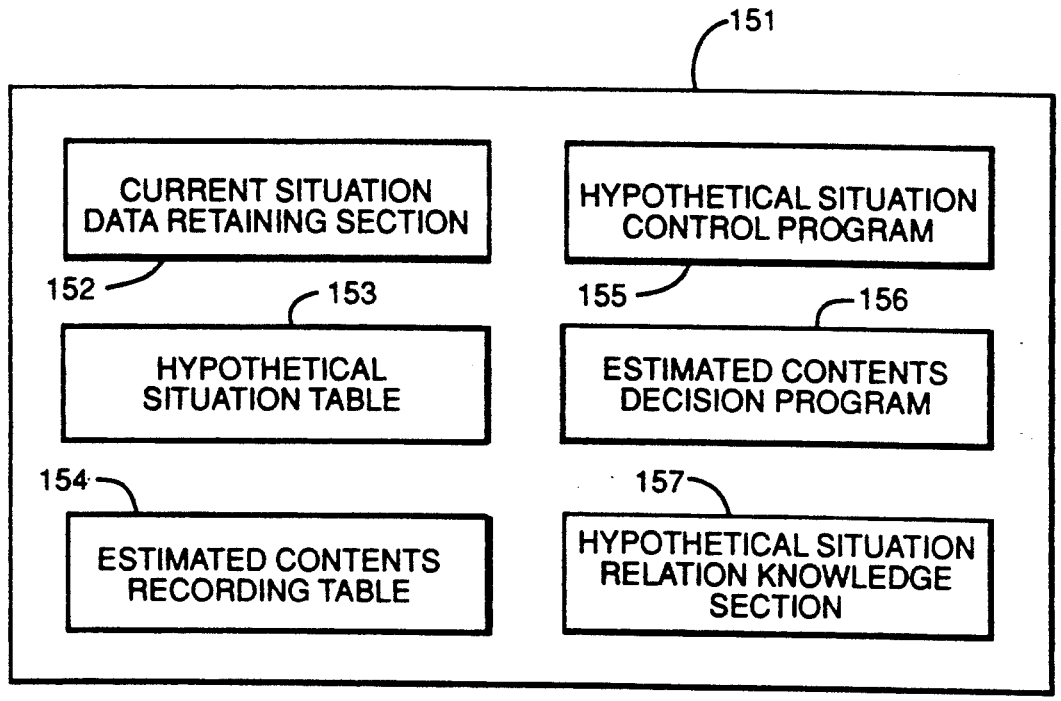
FIG. 15 illustrates the structure of the hypothetical situation control section.

FIG. 15 illustrates the structure of the hypothetical situation control section. FIG. 16 illustrates the structure of the hypothetical situation table shown in FIG. 15, and FIG. 17 illustrates the structure of the hypothetical situation relational expert knowledge section shown in FIG. 15, all as an alternative plan for the hypothetical situation control section 66 shown in FIG. 7, and the other structures thereof are the same as those already described.

In FIG. 15, there are a hypothetical situation and data retaining control section 151; a current situational data retaining section 152; a hypothetical situation table 153; an estimated contents recording table 154; a hypothetical situation control program 155; an estimated contents decision program 156; and a hypothetical situation relation expert knowledge section 157 in which the expert knowledge related to the strategy to be estimated and hypothetical situation are described by rule.

The hypothetical situation table 153 and the hypothetical situation relational expert knowledge section 157 are provided instead of the hypothetical situation relational table 74 shown in FIG. 7. By activating this hypothetical situation relational expert knowledge section 157, a strategy to be estimated and the corresponding hypothetical situation are drawn from the hypothetical situation table 153 based on the rule whereby the knowledges related to the strategy to be estimated and the hypothetical situation are described.

Figure 18:
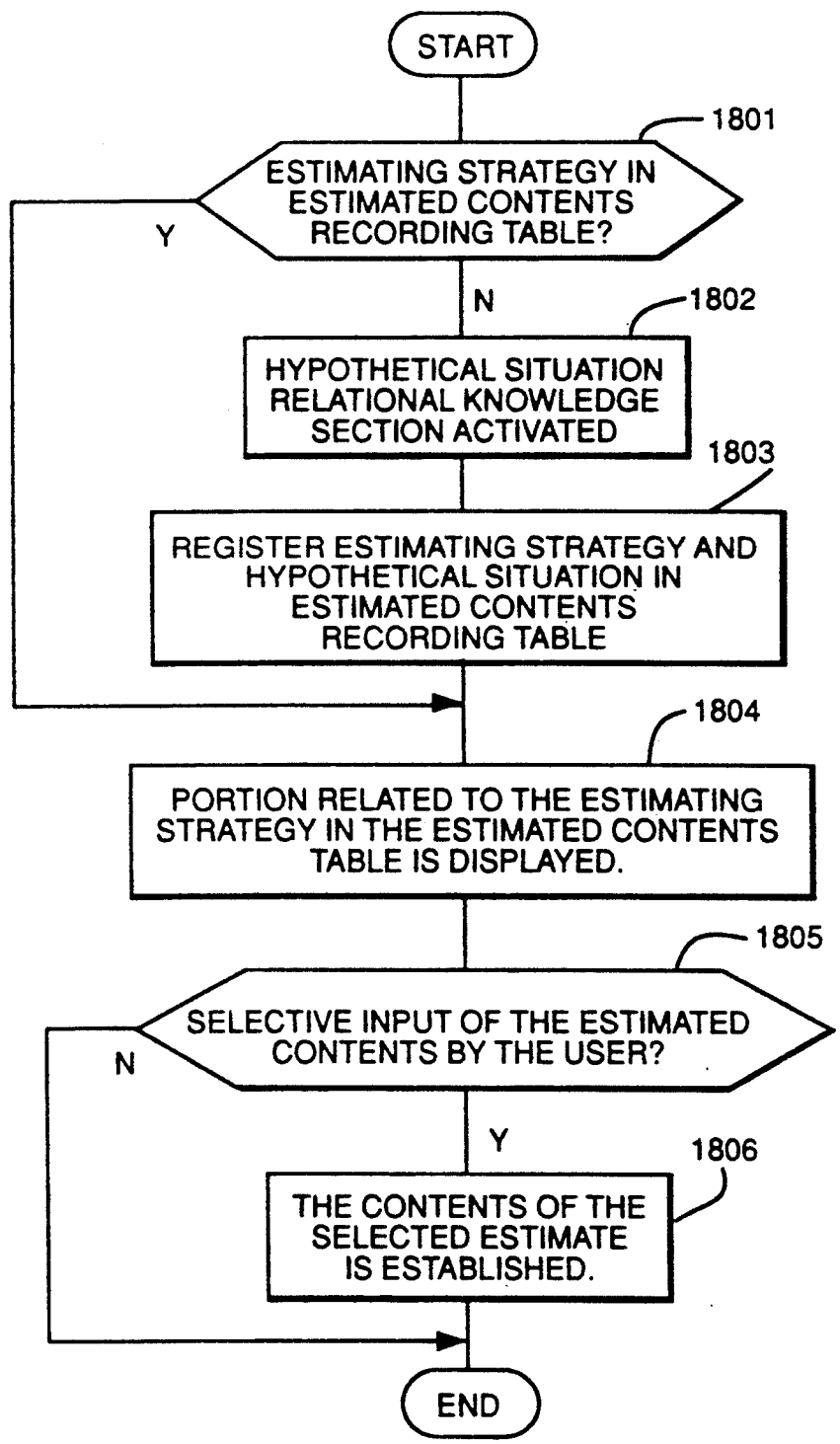
FIG. 18 is a flowchart showing the estimated contents decision processes.

FIG. 18 is a flowchart showing the estimated contents decision process.

Using the hypothetical situation table 153 and the hypothetical situation relational expert knowledge section 157 shown in FIG. 15 through FIG. 17, the estimated contents decision process of step 1204 shown on FIG. 12 is executed.

In other words, if a strategy to be estimated is not present in the estimated content recording table 154 according to step 1801, the hypothetical situation relational expert knowledge section 157 is activated in step 1802 to fetch the corresponding hypothetical situation for the strategy to be estimated from the hypothetical situation table 153. Then, with reference to the hypothetical situation table, the strategy to be estimated and the hypothetical situation thus fetched are additionally registered in the estimated contents recording table 154 in step 1803. Subsequently the portion related to the strategy to be estimated is displayed on the decided estimate content screen 71 shown in FIG. 6 by step 1804 to request the user to selectively input the estimated contents according to step 1805. If there is input by the user, the contents of the selected estimate are established in step 1806, then the process of FIG. 18 ends.

When the user judges a strategy, there can be simulation and output for display of a possible situation and the result of each of the strategies applied can be considered in accordance with the expert knowledge acquired from past experiences, or the user can recognize the hypothetical situations other than the situations that can be considered by the expert knowledge by the use of the hypothetical situation control processes required in the course of predicting the future of each strategy applied, or the possible result of a strategy applied, for which its hypothetical situation is generated.

In this way, the reliability of such strategy can be estimated, so that any possible misjudgment of the user can be prevented. Also, since the estimate results are accumulated, an optimum strategy planning can be supported by displaying these accumulated results.

Furthermore, according to the present invention, if there is conflict generated for strategies in the course of the inferring, the knowledge object is replicated, and the screen file and display terminal can be assigned automatically or interactively by the user's instruction to carry out a parallel execution/storage and parallel display/output. Hence it becomes possible to estimate strategies by parallel cooperative inferring between experts in different fields, including the user, to improve the reliability of the inferring and the man-machine interaction therefor.

Also, any strategy once estimated by the parallel cooperative inferring is automatically adopted for a continuous inferring unless otherwise instructed by the user, making it possible to provide for effective and highly reliable inferring.

EXAMPLE

An example of the present invention applied to the scheduling, more accurately rescheduling, of trains of a railway system will now be described with reference to FIGS. 19-21.

While an original scheduling of trains may be quite orderly, for various reasons a disordered schedule occurs after a period of time. With reference to FIG. 19, there is shown an example of a disordered schedule A and an ordered schedule B. With reference to the ordered schedule B, each line of the plot, which may be a display on a CRT screen or merely representative of data of a real train situation, each line of the figure represents the movement of a train, with time increase from left to right, movement in one direction (for example south) being from top to bottom and movement in the opposite direction being from bottom to top (for example north). This illustration is for one line of track, which in fact may have individual tracks moving both north and south as well as a plurality of tracks and platforms at each station, interchanges, and the like. At regular intervals, from north to south in the illustration, there are stations, for example Station No. 1, Station No. 2, Station No. 3, Station No. 4, and Station No. 5. Station No. 1 and Station No. 5 are terminal stations, where trains may be retired, that is, removed from the line, where trains may return to the line, and where trains may turn around to head in the opposite direction.

Trains may be removed from the line to decrease the frequency of the trains stopping at the stations, for example at the end of rush hour. Trains may be returned to the line to increase the frequency of trains stopping at the stations when entering rush hour. Trains may be removed from the line and returned a short time thereafter for the purpose of rescheduling, when it is desired to delay the turnaround of a particular train to move from a disordered schedule A to an ordered schedule B.

From the ordered schedule B, it is seen that trains will arrive at each of the stations in an orderly fashion, that is, at regular intervals between trains. In the disordered scheduling A, it is seen that the trains arrive at the stations with widely varying time intervals between arrivals. As an example, twenty trains may be provided per hour during non-rush hour times to provide three minute intervals, on the average, between trains at any particular station. As an example of a rush hour schedule, the trains may be provided at the rate of thirty trains per hour, at an average of two minutes between trains at each station. At times, a train must be held on the platform at a particular station longer than its ordered schedule is set for, because of the passage of a priority train, for example, when a high-speed express train passes through the station without stopping (not shown in the schedules in FIG. 19).

Figure 20:
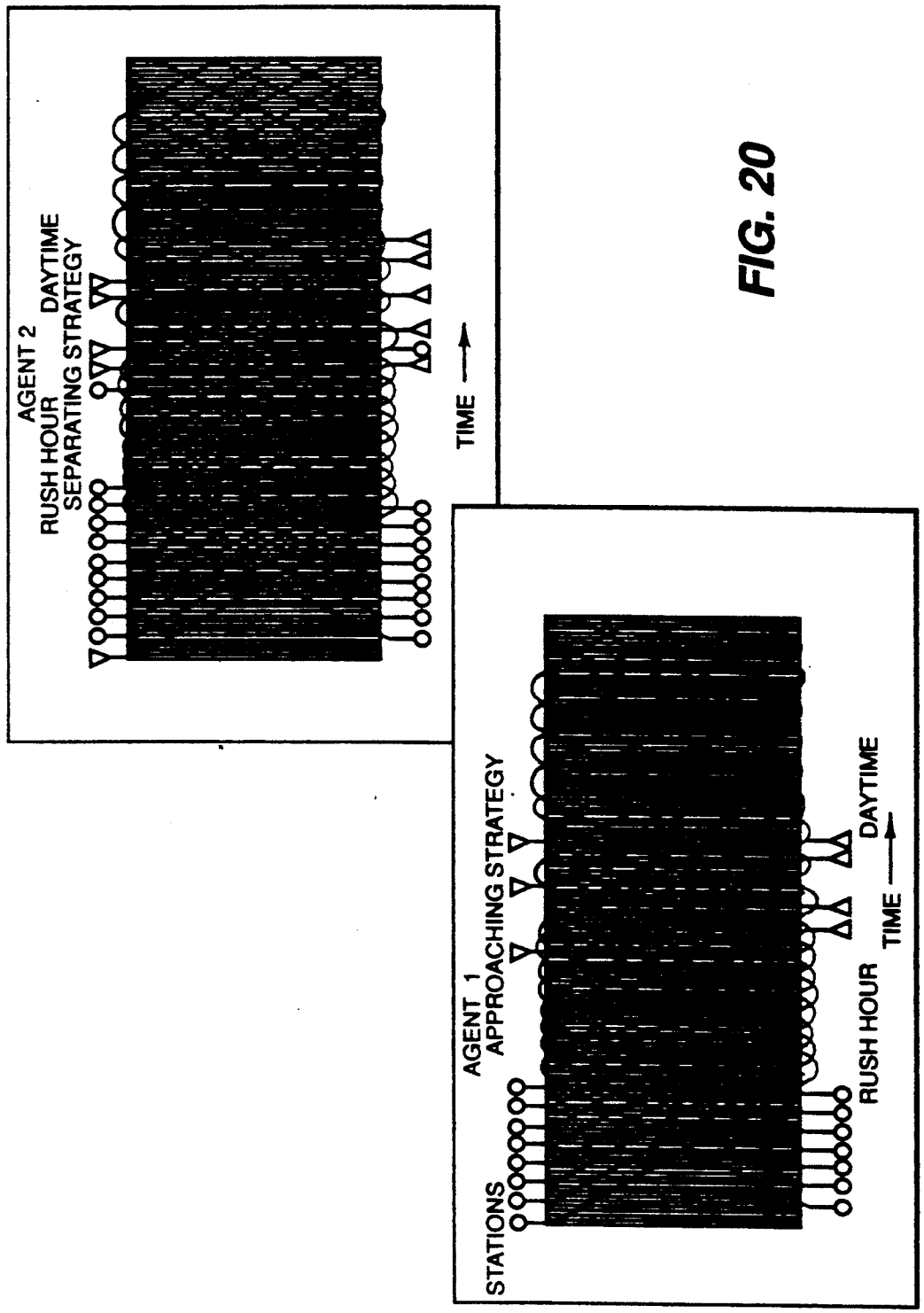
FIGS. 20 and 21 show multiwindow displays associated with FIG. 19.
Figure 21:
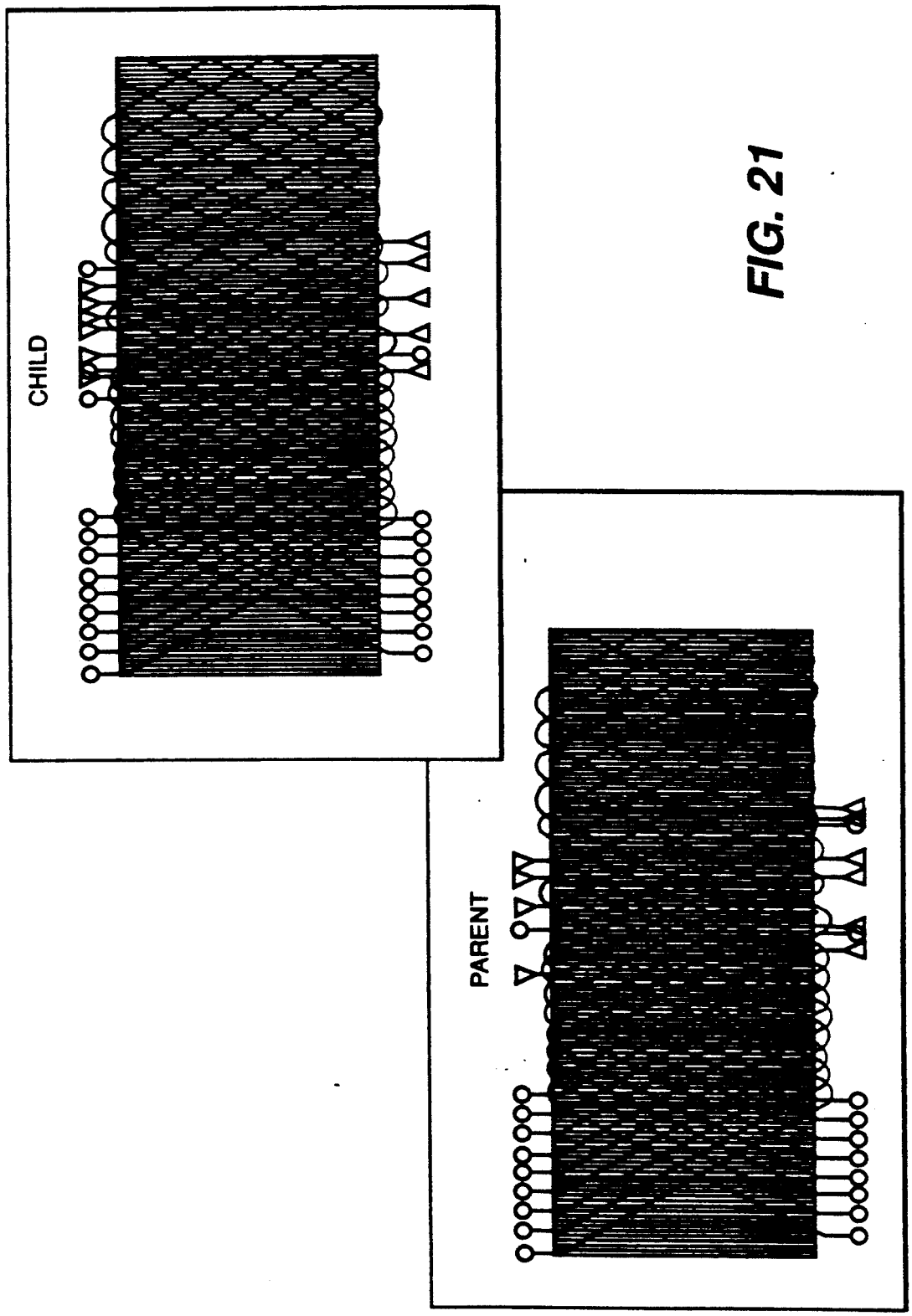

In FIGS. 20 and 21, for convenience of illustration, accurate lines are provided at Station No. 1 to show the turn-around of a train. These turn-arounds are orderly and at regular time intervals for the ordered schedule B, but vary widely for the disordered schedule A, because in the disordered schedule A, there may not be room enough at the platforms of Station No. 1, for example, for all of the trains arriving so that some may be removed and returned to the line to provide for delay, or held over because too many trains have arrived in the short period of time.

It will be assumed that this particular line under investigation started out with an ordered schedule B, and then for various reasons deteriorated to a disordered schedule A. It is now desired to change the disordered schedule A into the ordered schedule B. This is one example of a desired procedure according to the present invention. Another example would be to change an ordered schedule of 20 trains per hour into an ordered schedule of 30 trains per hour when moving into rush hour. With respect to FIG. 19, it is assumed that the object of the inference management system is to establish the disordered schedule A as an ordered schedule B, and the problem is to connect up the lines of schedule A to the lines of schedule B in the optimum manner. The time could be considered as running continuously from the right hand portion of schedule A to the left hand portion of schedule B so that the right-hand-most train arriving at Station No. 1 turns around at the time interval $\Delta t$ between schedule A and schedule B to become the first train leaving Station No. 1 according to schedule B, according to turn-around time interval $\Delta t$.

This situational data can be the start of inferring reasoning using the data of the disordered schedule A and the ordered schedule B. Inferring reasoning would proceed upon a strategy. However, here there are two conflicting strategies provided by the kernel object section. The first strategy is that the ordered schedule B can be moved toward the disordered schedule A, that is decrease $\Delta t$. The second strategy would be to move the disordered schedule A relatively away from the ordered schedule B, that is increase $\Delta t$. Therefore, it is seen that the two conflicting strategies are the increase of $\Delta t$ and the decrease of $\Delta t$, or separate and approach.

The present invention solves this conflict by replicating the knowledge object 4 in an amount equal to the number of conflicting strategies (approach and separate), which here is two times the number of hypothetical situations (schedule B), which here is one. The situational data, disordered schedule A is applied to each knowledge object (replicated) 17' and 17. The situational data A is used with each knowledge object (replicated)17 and 17' for parallel inferring.

Figure 19:
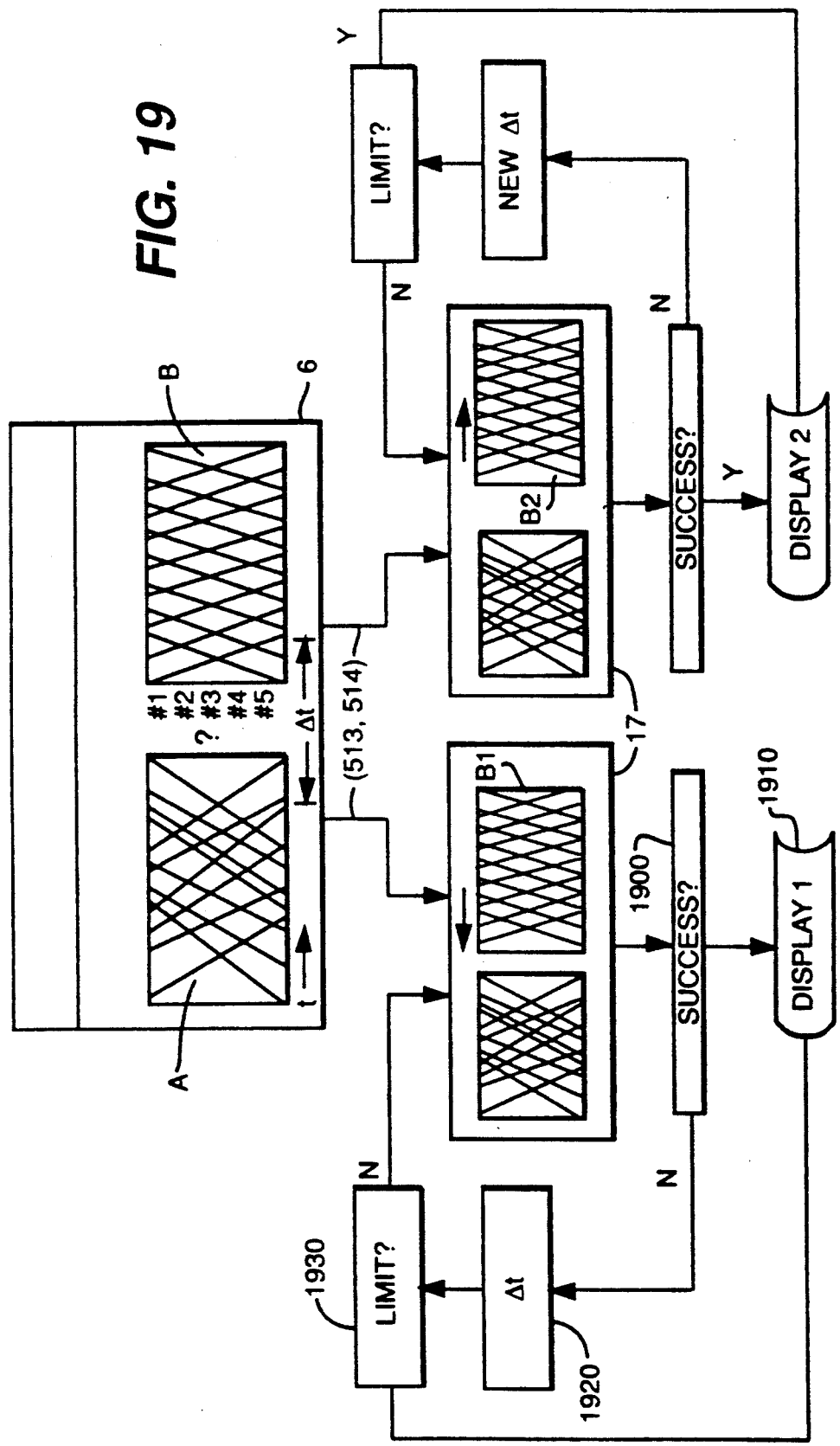
FIG. 19 shows the invention as applied to train rescheduling.

With reference to FIG. 5, step numbers have been inserted in FIG. 19, with respect to replicate step 513 and data transferral step 514. Each knowledge object (replicated) 17 and 17' will determine the possibility of the connection with the present $\Delta t$ and if it is a successful good connection, a yes answer, in step 1900, will be the result reported to display step 1910 for display to the user; for example, a judgmental value may be given to the connection and if it exceeds a desired level or if it is the best value of all the connections tried, a yes answer will be returned to display the best connection. If the answer is no, step 1920 will determine a new $\Delta t$, which according to the left hand strategy would decrease $\Delta t$ and in accordance with the right hand strategy would increase $\Delta t$. Step 1930 determines if the limit of the strategy has been reached, which for the left hand strategy, for example, would be $\Delta t=0$ which is, of course, impossible, because you cannot turn around the train with no delay, because of the need for moving the driver from one end of the train to the other and discharging/charging passengers. If the limit has not been reached, the inferring provided by the knowledge objects (replicated) 17 and 17' is repeated to again travel through step 1900. If the result of the determination in 1930 is that yes the limit of the strategy has been reached, control is returned to step 1910 to display the inferring results. The knowledge objects (replicated) 17 will perform their inferring simultaneously, that is concurrently or parallel. A display of the results may take the form shown in FIG. 20 or FIG. 21, which respectively indicate different examples.

In FIG. 20, agent 1, from one knowledge object (replicated) 17 displays its results and agent 2, from the other knowledge object (replicated) 17' displays its results in multiwindows on a single display, for example. In these displays, the circle indicates that a new car is added from the storage shed and the triangle indicates that a car is removed from the rail line and placed in the storage shed. In FIG. 20, agent 1, is displaying its best result of inferring with it's strategy and agent 2 is displaying it's best result of inferring with it's strategy. These results are returned to the knowledge object 4, which will be taken out of the wait state to automatically determine by inferring which of the two results is the best result and will automatically implement the best result, unless the user intervenes and chooses another result other that the result selected by the system. In FIG. 20, the object was to connect a rush hour schedule to a non-rush hour schedule. In FIG. 21, the same object was present, but the initial situational data was different.

With reference to FIG. 5, the system would be initialized in step 500 with the situational data entered automatically or by the user as the object of the execution, for example connection of a rush hour schedule to a non-rush hour schedule according to the input situational data in step 501. In the execution of step 503, it may be found that there are two conflicting strategies from step 504, namely the approaching and the separating strategies. In step 505, the user would request or the system would automatically implement parallel processing of the strategies, which would be conducted according to the procedures of FIG. 5(b). The mode is changed according to step 511 for the inferring. In step 512, a hypothetical situation would be set forth, such as the original $\Delta t$ to be used for both strategies. Since there are two conflicting strategies, that is approaching and separating and one hypothetical situation, replication would provide two knowledge objects (replicated) 17, 17' in step 513. The situational data, that is the existing train schedule, would be moved to each knowledge object (replicated) 17, 17' in step 514. In step 515, the knowledge object 4 would be placed in a wait state awaiting the results from the knowledge objects (replicated) 17, 17'. The mode would be changed in step 516.

In step 517, estimation would be conducted in parallel according to inferring reasoning, and the inferring would be terminated if a fixed time limit is reached. The fixed time limit may be adjusted for various conditions and is in general set at a value by the knowledge object 4. In the real world, there are limits within which decisions must be made. With breaking of the inferring reasoning, the best results to date would be displayed so that the user could pick one of them. If the inferring is completed or interrupted due to exceeding the time limit, the results of the inferring are displayed in step 519, which display would take the form of FIG. 20 or FIG. 21, for example. The mode will change in step 520 for inquiry of the user in step 521, as explained above, in the case that the user wants to select their own estimated result, step 522, rather than accepting the automatic selection of estimated results according to the expert knowledge, step 523. If there is an overriding priority, the user's choice or the expert selection may be overridden in step 524. Referring to FIG. 5(a) priority may be changed by the user in step 507 and in step 508 the user may input a more precise hypothetical situation, for example a smaller $\Delta t$. Although the present example has only two possible strategies it will be recognized that there are certain situations where there may be additional strategies that can be entered. Also the user could provide three hypothetical situations, for example an incremental change of Δt=3, 6 and 9 seconds, so that six knowledge objects (replicated) 17 would be replicated from the knowledge object 4 and conduct their inferring in parallel.

FIG. 10 refers to the flow of the agent or knowledge objects (replicated) 17 with respect to the estimation for a hypothesis, for inferring reasoning. The inputted problem in step 1001 may be executed in step 503, and more specifically may involve a Δt of one minute, and later when a more precise user inquiry is made, the user may insert a Δt of 10 seconds to repeat the processing of FIG. 5. In step 1301 of FIG. 3, the user can select a mode for example No. 2 in FIG. 9. In step 1303 a situation No. 2 in the table of FIG. 9 would be displayed. Step 1205 of FIG. 12 would involve the execution of the estimate for situation No. 2 of FIG. 9 and step 1207 would register the results of the inferring the table of FIG. 9. With respect to FIG. 15, the user can change the default setting condition No. 2 of FIG. 9.

The knowledge object (replicated) 17 contains: at a minimum, only enough of the knowledge object 4 so that parallel inferring may be conducted together with the knowledge object 4 or another knowledge object (replicated) 17; usually a kernel knowledge section or a kernel knowledge section and one of the expert knowledge models 12 or 13; or at a maximum a duplicate of the entire knowledge object 4.

The system and method, when inferring with duplicate knowledge objects for the unique combinations of different strategies and different hypothetical situations, upon encountering conflicting different strategies, can further replicate. At this time, the system will replicate the duplicate knowledge objects that were inferring when the conflicting strategies occured during the course of the parellel inferring with the duplicate knowledge objects for inferring to thereby produce a second generation of duplicate knowledge objects for inferring. Thereafter, the second generation of duplicate knowledge objects will continue the parallel inferring, respectively, with respect to the conflicting different strategies of the duplicate knowledge objects of the first generation using the situational data present at the time of the conflict with the duplicate knowledge objects for inferring.

All of the features, functions and structures discussed above are combined into a single inference management system, which sometimes has alternate managements selected automatically or with user input.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. An inference management system for use by a user with a computer system, comprising:
    a knowledge object having at least one expert knowledge model, and a kernel knowledge section for executing the control of, management of an inferring with different strategies using the one expert knowledge model;
    means for replicating at least the inferring function of the kernel knowledge section, when there are conflicting different strategies in the course of inferring by the kernel knowledge section with the at least one expert knowledge model and with at least one set of situational data, to produce plural knowledge objects (replicated), each capable of parallel inferring with another knowledge object (replicated);
    said knowledge objects (replicated) thereafter being means for concurrently inferring in parallel using the conflicting different strategies respectively to produce parallel inferring results, and each of the means using the at least one set of situational data used at the time of conflict; and
    said knowledge object including means to place its operation in a wait state during the parallel inferring of only the knowledge objects (replicated).

2. The system of claim 1, including means for removing knowledge objects (replicated).

3. The system of claim 2, including means for automatically selecting an optimum strategy from the parallel inferring results of the knowledge objects respectively using the conflicting different strategies; and
    means for confirming the selection of the optimum strategy by outputting the parallel inferring results, inquiring of the user and permitting user input of a new optimum strategy different from the optimum strategy selected by the means for automatically selecting.

4. The system of claim 3, including means for automatically breaking one of the parallel inferring when a respective fixed period of time limit is exceeded on the one of the parallel inferring without breaking the other parallel inferring.

5. The system of claim 4, wherein the corresponding knowledge object fixes said fixed period of time limit.

6. The system of claim 3, wherein said means for confirming interacts with the user through a multi-window environment.

7. The system of claim 3, including means for inputting the different strategies by the user, and
    wherein the kernel knowledge section includes means for storing a strategy lastly inputted by the user as the most preferred strategy for inferring together with the conflicting strategy, and means for selecting the most preferred strategy as an optimal strategy over the conflicting strategy.

8. The system of claim 1, including means for automatically selecting an optimum strategy from the parallel inferring results of the knowledge objects respectively using the conflicting different strategies; and
    means for confirming the selection of the optimum strategy by outputting the parallel inferring results, inquiring of the user and permitting input of a user choice different from the optimum strategy selected by the means for automatically selecting, for adoption of a new optimum strategy.

9. The system of claim 8, including means for inputting the different strategies by the user, and
    wherein the kernel knowledge section includes means for storing a strategy lastly inputted by the user as the most preferred strategy for inferring together with the conflicting strategy, and means for selecting the most preferred strategy as an optimal strategy over the conflicting strategy.

10. The system of claim 1, including means for automatically breaking one of the parallel inferring when a fixed period of time limit is exceeded on the one of the parallel inferring without breaking the other parallel inferring.

11. The system of claim 1, wherein said means for confirming interacts with the user through a multi-window environment.

12. A system of claim 1, said knowledge object including a plurality of different expert knowledge models;
said kernel knowledge section selecting said one expert knowledge model from among the different expert knowledge models; and
said means for replicating further replicating the at least one expert knowledge model, when there are conflicting different strategies in the course of inferring by the kernel knowledge section with the at least one expert knowledge model and with at least one set of situational data, to produce the at least one knowledge object (replicated).

13. A system of claim 1, including:
said knowledge object having means for generating different hypothetical situations during inferring;
said means for generating further having means for user establishing a new hypothetical situation that is not usually generated by the knowledge object during inferring when the conflicting occurs with the different strategies; and
said kernel knowledge section having means for estimating the reliability and effectiveness of the different strategies by inferring with the different strategies and the new hypothetical situation to produce estimating results, and outputting the estimating results.

14. A system according to claim 13, wherein said means for estimating uses situational data in use when the conflict is generated for said estimating.

15. A system according to claim 13, including means for requesting the user to input a hypothetical situation to be analyzed for conflicting different strategies.

16. A system according to claim 13, including means for storing relationships between the conflicting different strategies and the hypothetical situations in a hypothetical case relational table; and
means for fetching a hypothetical situation for a strategy to be estimated from the hypothetical case relational table.

17. A system according to claim 16, including means for storing data obtained when the conflict is generated for strategies, the different strategies, hypothetical situations used for the estimating and the estimate results with an estimate case number, and said means for fetching using the case number.

18. A system according to claim 13, including means for storing the hypothetical situations in a data table, with relationships between the different strategies and the hypothetical situations established by rules.

19. A system according to claim 13, wherein said knowledge object includes means for using a knowledge database for fetching an optimum strategy from past estimating results when the conflict is generated for different strategies and automatically selecting one of the conflicting different strategies based on the knowledge database, so that the conflicting different strategies are modified interactively.

20. An inference management method executed by a computer system, comprising:
executing control of, management of, and inferring with a knowledge object comprised by at least one kernel knowledge section and a selected one of a plurality of different expert knowledge models;
replicating the knowledge object by replicating at least the selected one expert knowledge model and the at least one kernel knowledge section to produce plural knowledge objects (replicated), when there is conflict in the course of inferring with situational data with use of at least one strategy and use of at least one hypothetical situation;
thereafter inferring in parallel with the plural knowledge objects (replicated) that are equal in number to the number of conflicting strategies times the number of different hypothetical situations, with each duplicate kernel knowledge section respectively inferring with a unique combination of a hypothetical situation and a conflicting strategy and with a separate one of duplicate expert knowledge models, respectively, and each of the knowledge objects (replicated) using the same common situational data to produce parallel inferring results; and
placing the knowledge object in a wait state during the parallel inferring of only the knowledge objects (replicated).

21. The method of claim 20, including thereafter removing knowledge objects (replicated).

22. The method of claim 21, including automatically selecting an optimum strategy from the parallel inferring results; and
confirming the selection of an optimum strategy, by outputting the inferring results for display, inquiring of the user and permitting input of a user choice among the strategies that produced the inferring results for adoption of a new optimum strategy.

23. The method of claim 22, including automatically breaking one of the parallel inferring when a fixed period of time limit is exceeded on the one of the parallel inferring without breaking the other parallel inferring.

24. The method of claim 23, including setting the fixed period of time limit in dependence upon the respective knowledge object.

25. The method of claim 22, including outputting the parallel inferring results for display and interaction with the user through a multi-window environment.

26. The method of claim 22, including generating different strategies, and storing a strategy lastly inputted by the user as the most preferred strategy together with the strategies generated.

27. A method according to claim 20, including automatically selecting an optimum strategy by estimating the parallel inferring results; and
confirming the selection of a strategy by outputting the parallel inferring results, inquiring of the user and permitting input of a user choice, among the strategies that produced the parallel inferring results, different from that selected by the automatically selecting, for adoption of a new optimum strategy.

28. A method according to claim 27, including generating different strategies and including storing a strategy inputted by the user as a preferred strategy over the strategies generated.

29. A method according to claim 20, including automatically breaking one of the parallel inferring when a fixed period of time limit is exceeded on the one of the parallel inferring without breaking the other parallel inferring.

30. A method of claim 20, including outputting the parallel inferring results and interacting with the user through a multi-window environment.

31. The method of claim 20, including:
generating different hypothetical situations and strategies for inferring with the hypothetical situation;
when the conflict occurs, inputting a user established new hypothetical situation that is not usually generated for each strategy; and
estimating the reliability and effectiveness of the conflicting different strategies by inferring with use of the conflicting different strategies for the user established hypothetical situation and outputting the inferring results.

32. A method according to claim 31, including using the situational data that was being used for the inferring when the conflict was generated for said estimating.

33. A method according to claim 31, including requesting the user to establish hypothetical situations to be analyzed for conflicting different strategies.

34. A method according to claim 31, including storing relationships between the conflicting different strategies and hypothetical situations in a hypothetical case relational table; and
fetching a hypothetical case for a strategy to be estimated from the hypothetical case relational table at a later time with respect to a similar case.

35. A method according to claim 31, including storing data comprising user situational data, situational data in use when the conflict was generated, the different conflicting strategies, hypothetical situations used for the estimating and the estimating results with an estimate case identifier, and thereafter fetching the stored data using the case identifier for use at a later time for a similar case.

36. A method according to claim 31, including storing the hypothetical situations in a data table, with relationships between the different strategies and the hypothetical situations established by rules, for recall and use at a later time for a similar situation.

37. A method according to claim 31, including using a knowledge database for fetching an optimum strategy from past estimating results when the conflict is generated for different strategies and automatically selecting one of the conflicting strategies based on the knowledge database, so that the conflicting strategies are modified interactively.

38. An inference management system for use in a computer system, comprising:
a knowledge object having an expert knowledge section with a plurality of expert knowledge models, and a kernel knowledge section for selecting, executing the control of, management of, and inferring with the selected expert knowledge model;
means for generating different strategies and different hypothetical situations;
means for replicating the knowledge object when there are conflicting different strategies in the course of inferring by the kernel knowledge section with the selected expert knowledge model using one set of situational data to produce plural knowledge objects (replicated) equal to the number of conflicting strategies times the number of hypothetical situations used in the inferring when the conflict occurred;
means for controlling said knowledge objects (replicated) for inferring in parallel, each using a unique combination of one of the conflicting different strategies and one of the hypothetical situations respectively, and each using the same one set of situational data used at the time of conflict to produce parallel inferring results;
said knowledge object including means to place its operation in a wait state during the parallel inferring of only the knowledge objects (replicated);
means for thereafter removing knowledge objects (replicated);
means for automatically selecting an optimum strategy from the parallel inferring results; and
means for confirming the selection of the optimum strategy by outputting the parallel inferring results, inquiring of the user and permitting input of a user choice different from the optimum strategy selected by the means for automatically selecting, for adoption of a new optimum strategy.

39. The system of claim 38, including means for automatically breaking one of the parallel inferring when a fixed period of time limit is exceeded on the one of the parallel inferring without breaking the other parallel inferring.

40. An inference management system for use by a user with a computer system, comprising:
a knowledge object having at least one expert knowledge model, and a kernel knowledge section for executing the control of, management of and inferring with different strategies using the one expert knowledge model;
said knowledge object having means for generating different hypothetical situations during inferring;
means for replicating at least the inferring function of the kernel knowledge section to produce plural knowledge objects (replicated), each capable of parallel inferring with another of the knowledge objects (replicated);
said knowledge objects (replicated) thereafter being means for concurrently inferring in parallel using the different hypothetical situations respectively to produce parallel inferring results; and
said knowledge object including means to place its operation in a wait state during the parallel inferring of only the knowledge objects (replicated).

41. The system of claim 40, including means for removing knowledge objects (replicated).

42. The system of claim 41, including means for automatically selecting an optimum strategy from the parallel inferring results of the knowledge objects respectively; and
means for confirming the selection of the optimum strategy by outputting the parallel inferring results, inquiring of the user and permitting user input of a new optimum strategy different from the optimum strategy selected by the means for automatically selecting.

43. The system of claim 42, including means for automatically breaking one of the parallel inferring when a respective fixed period of time limit is exceeded on the one of the parallel inferring without breaking the other parallel inferring.

44. The system of claim 43, wherein the corresponding knowledge object fixes said fixed period of time limit.

45. The system of claim 42, wherein said means for confirming interacts with the user through a multi-window environment.

46. The system of claim 42, including means for inputting the different strategies by the user, and
wherein the kernel knowledge section includes means for storing a strategy lastly inputted by the user as the most preferred strategy for inferring, and means for selecting the most preferred strategy as an optimal strategy over the conflicting strategy.

47. The system of claim 40, including means for automatically selecting an optimum strategy from the parallel inferring results of the knowledge objects respectively using the conflicting different strategies; and
means for confirming the selection of the optimum strategy by outputting the parallel inferring results, inquiring of the user and permitting input of a user choice different from the optimum strategy selected by the means for automatically selecting, for adoption of a new optimum strategy.

48. The system of claim 47, including means for inputting the different strategies by the user, and
wherein the kernel knowledge section includes means for storing a strategy lastly inputted by the user as the most preferred strategy for inferring, and means for selecting the most preferred strategy as an optimal strategy over the conflicting strategy.

49. The system of claim 40, including means for automatically breaking one of the parallel inferring when a fixed period of time limit is exceeded on the one of the parallel inferring without breaking the other parallel inferring.

50. The system of claim 40, wherein said means for confirming interacts with the user through a multi-window environment.

51. A system of claim 40, wherein
said knowledge object includes a plurality of different expert knowledge models;
said kernel knowledge section selecting said one expect knowledge model from among the different expert knowledge models; and
said means for replicating further replicating the at least one expert knowledge model to produce the at least one knowledge object (replicated).

52. A system of claim 40, including:
said means for generating further including means for user establishing a new hypothetical situation that is not usually generated by the knowledge object during inferring; and
said kernel knowledge section having means for estimating the reliability and effectiveness of the different strategies by inferring with the different strategies and the new hypothetical situation to produce estimating results, and outputting the estimating results.

53. A system according to claim 52 including means for requesting the user to input a hypothetical situation to be analyzed for conflicting different strategies.

54. A system according to claim 52, including means for storing relationships between the conflicting different strategies and the hypothetical situations in a hypothetical case relational table; and
means for fetching a hypothetical situation for a strategy to be estimated from the hypothetical case relational table.

55. A system according to claim 54, including means for storing data obtained when the replicating occurs, the different strategies, hypothetical situations used for the estimating and the estimate results with an estimate case number, and said means for fetching using the case number.

56. A system according to claim 52, including means for storing the hypothetical situations in a data table, with relationships between the different strategies and the hypothetical situations established by rules.

57. A system according to claim 52, wherein said knowledge object includes means for using a knowledge database for fetching an optimum strategy from past estimating results when the conflict is generated for different strategies and automatically selecting one of the conflicting different strategies based on the knowledge database, so that the conflicting different strategies are modified interactively.

* * * * *